June 10, 1941.   C. N. BROOKS   2,245,181
PROCESS AND APPARATUS FOR PRODUCING CYLINDRICAL CERAMIC TILE
Filed Oct. 10, 1938   5 Sheets-Sheet 1

INVENTOR
CHARLES N. BROOKS
BY
Johnston & Jennings
ATTORNEYS

June 10, 1941.  C. N. BROOKS  2,245,181
PROCESS AND APPARATUS FOR PRODUCING CYLINDRICAL CERAMIC TILE
Filed Oct. 10, 1938   5 Sheets-Sheet 2
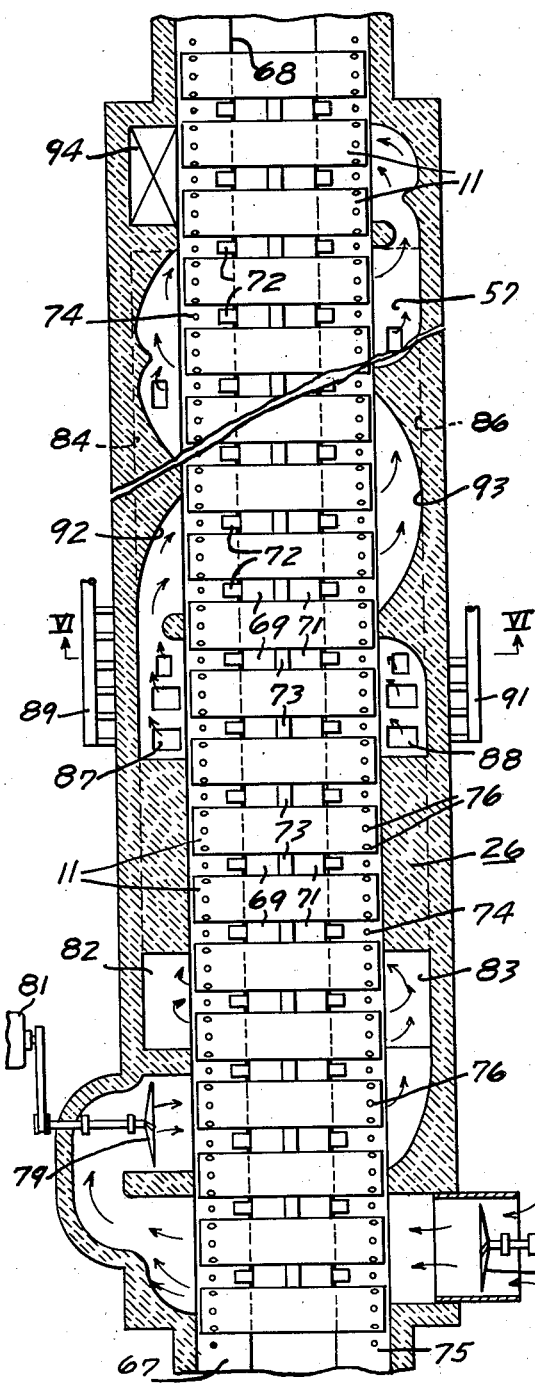
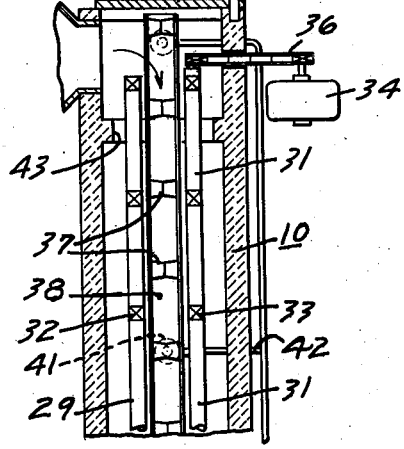
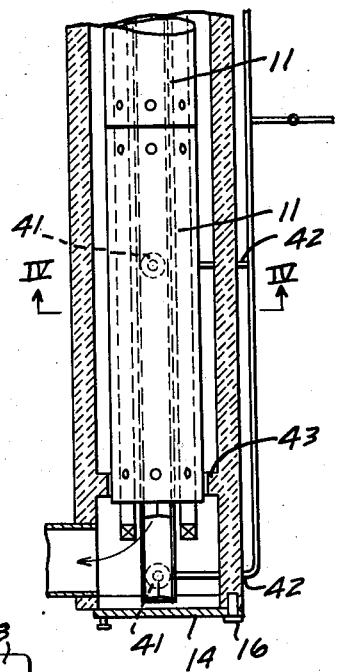
INVENTOR
CHARLES N. BROOKS
BY
Johnston & Jennings
ATTORNEYS

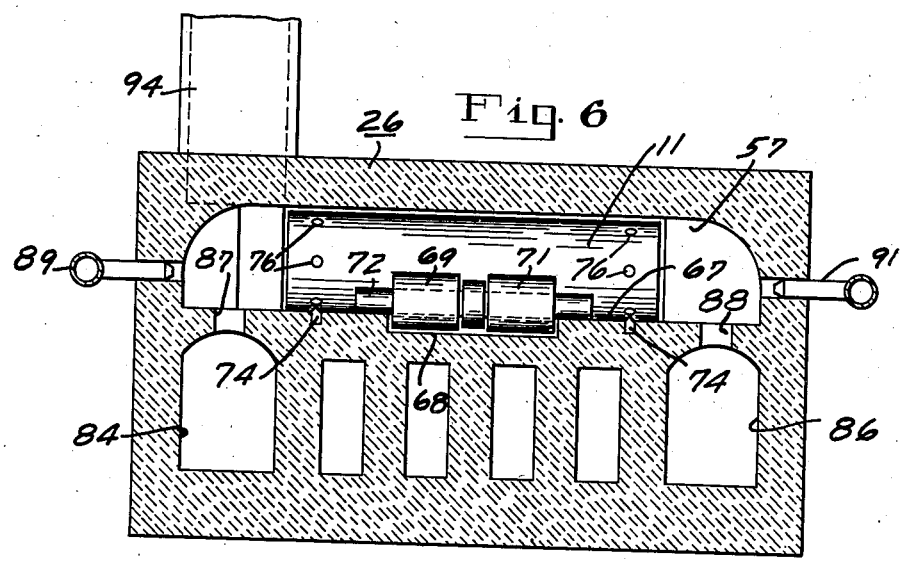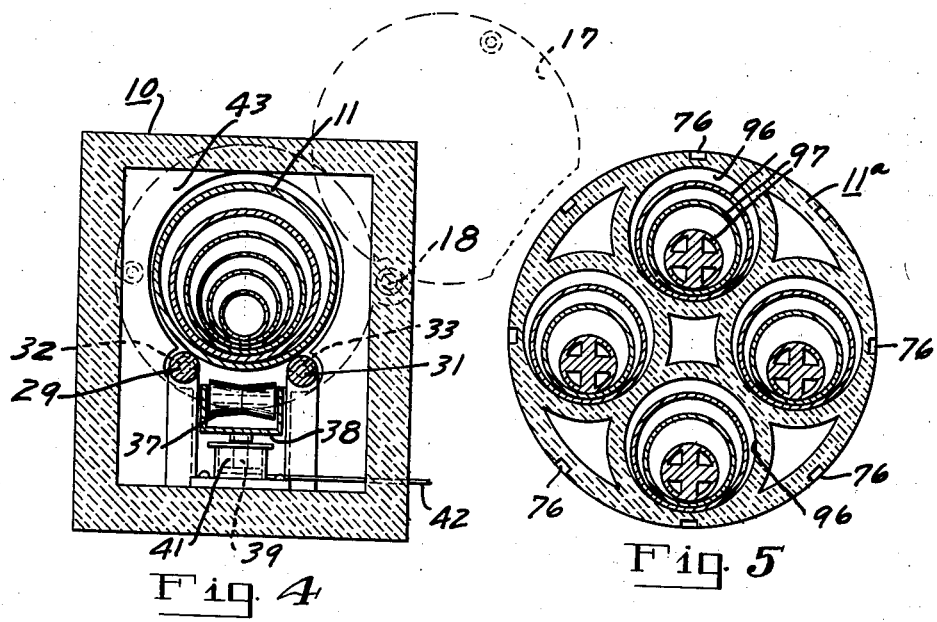

June 10, 1941.  C. N. BROOKS  2,245,181
PROCESS AND APPARATUS FOR PRODUCING CYLINDRICAL CERAMIC TILE
Filed Oct. 10, 1938  5 Sheets-Sheet 4

INVENTOR
CHARLES N. BROOKS
BY
Johnston & Jennings
ATTORNEYS

June 10, 1941. C. N. BROOKS 2,245,181
PROCESS AND APPARATUS FOR PRODUCING CYLINDRICAL CERAMIC TILE
Filed Oct. 10, 1938 5 Sheets-Sheet 5
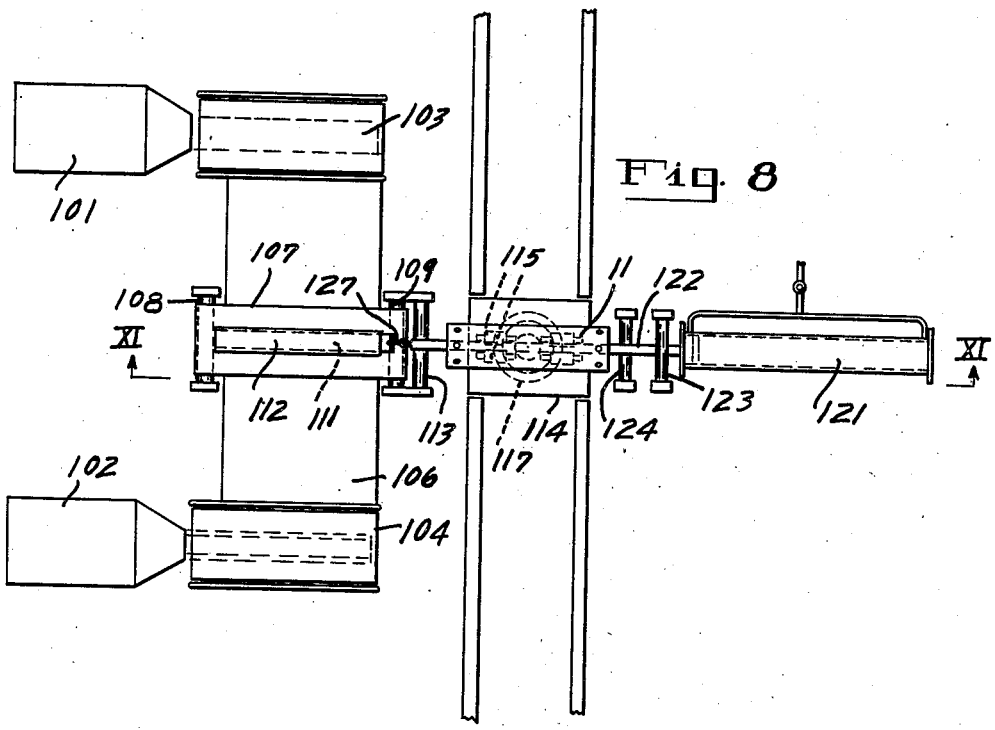
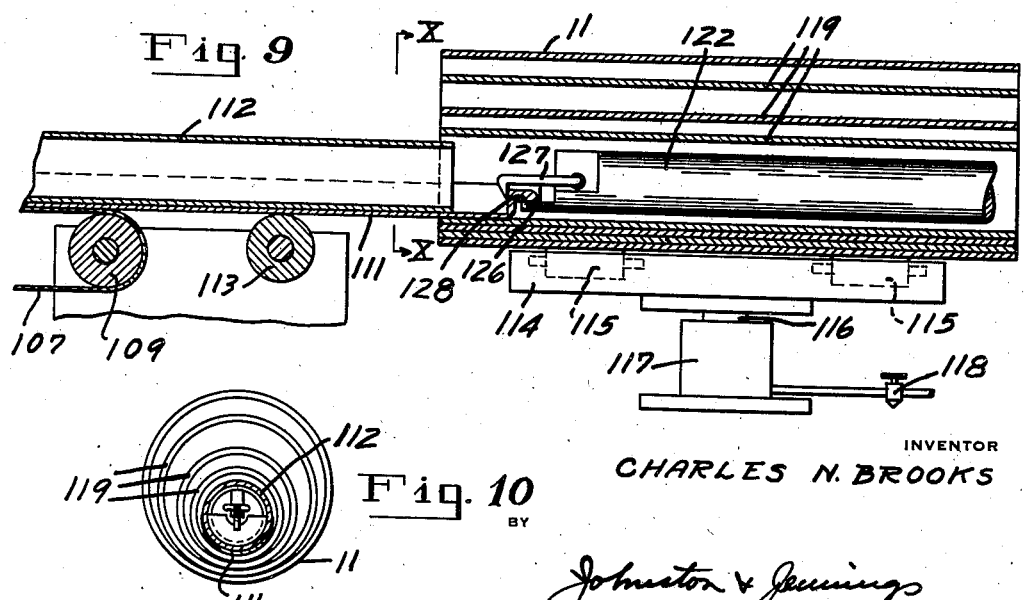
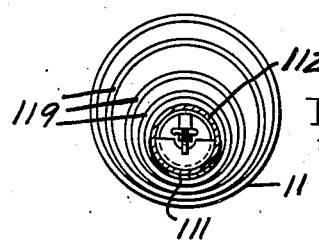
INVENTOR
CHARLES N. BROOKS
BY
Johnston & Jennings
ATTORNEYS Patented June 10, 1941

2,245,181

UNITED STATES PATENT OFFICE 2,245,181

PROCESS AND APPARATUS FOR PRODUCING CYLINDRICAL CERAMIC TILE

Charles N. Brooks, Birmingham, Ala.

Application October 10, 1938, Serial No. 234,127

11 Claims. (Cl. 25—142)

This invention relates to the manufacture of cylindrical ceramic tile and has for an object the provision of a method and apparatus therefor which shall greatly simplify the production of such tile and greatly reduce the space required for drying and burning, as compared with prior methods.

A further object of my invention is to provide a method whereby a plurality of cylindrical tile may be extruded one within the other from a single extruding machine or may be extruded, or formed, singly, to be nested within a supporting cylinder and dried or burned by passing the drying or burning gases longitudinally through the supporting cylinder and tile, and at the same time maintain the tile in cylindrical form.

A still further object of my invention is to provide a method of making cylindrical ceramic tile in which a plurality of green or undried tile are nested within a supporting cylinder and drying air passed longitudinally therethrough, and rotating the supporting cylinder to maintain the undried tile in a cylindrical form.

A further object of my invention is to provide a method of producing cylindrical ceramic tile which shall include a simple, easily manipulated method and apparatus for nesting the smaller diameter tile within the larger.

A still further object of my invention is to provide an improved apparatus for producing cylindrical ceramic tile including an improved drier and a kiln in which the dried tile are burned, both of which shall include improved means for maintaining the tile in cylindrical form while drying and burning.

A still further object of my invention is to provide an improved container for supporting cylindrical ceramic tile while being dried and burned which shall be adapted to maintain the tile in cylindrical form.

In the production of cylindrical ceramic tile, as heretofore practiced, two major difficulties have been encountered, both of which greatly influenced the cost of the finished article. It has been found difficult to maintain the tile in cylindrical form while drying and burning, resulting in a large percentage of the tile becoming misshapen and unusable. Further, the method of handling the tile has necessitated a relatively large space for drying and burning, and such large, expensive driers and kilns have been necessary to accommodate the tile being produced, that the expense has been unduly great.

It is well known in the art to which my invention relates that if a freshly formed plastic cylinder be kept in rotation, it will maintain its cylindrical form. In my invention, I have taken advantage of this property and have provided a means whereby one or more freshly formed tile are nested within a supporting cylinder which is kept in rotation while the tile are drying and burning. By employing a cylindrical refractory container I am able to nest or telescope cylindrical tile of progressively decreasing diameters within each other and all within the supporting cylinder whereby a maximum of drying and burning may be accomplished within a minimum of space.

My invention contemplates means for placing the freshly formed tile within the supporting cylindrical containers and within each other, a drying tunnel in which the cylindrical containers are placed and moved endwise through the tunnel with drying air circulating longitudinally through the cylinders around the tile, followed by a kiln through which the cylinders are rolled while burning gases are caused to pass longitudinally through them, thus according equal contact with the gases with all of the tile and an even burning thereof.

During the time that the cylinders are within the drying tunnel, they are made to rest upon sets of rollers extending longitudinally through the tunnel, which sets of rollers are driven by suitable power means, thus maintaining the cylinders in rotation. The cylinders are advanced in the tunnel by raising them off the longitudinally extending rollers at intervals and supporting them on transversely extending rollers while they are being pushed through the tunnel. In this step of the operation, the placing of a supporting cylinder within one end of the tunnel serves to push a cylinder containing dried tile out at the other end. Drying air is blown through the entire series of cylindrical containers from one end of the tunnel to the other.

After drying, the supporting cylinders, together with the nested tile, are placed directly in a kiln to be burned which, according to my invention, is in the form of a tunnel of a cross sectional area only slightly greater than the overall dimensions of the supporting cylinders, which are rolled through the kiln barrel fashion. Means, such as a cooperating rack and gear, are provided on the floor of the tunnel and the supporting cylinders respectively, whereby the cylinders are maintained in alignment in their travel through the kiln. Spacing and friction reducing rollers are interposed between the supporting cylinders which serve to reduce the power required to move the cylinders through the tunnel. Power means are provided for introducing and removing the supporting cylinders from the kiln. By the means thus briefly described I provide for the continuous production of cylindrical tile with a minimum of loss and employing a minimum of drying and burning space.

Apparatus embodying features of my invention is illustrated in the accompanying drawings forming a part thereof, and in which—

Fig. 2 is a sectional plan view of the drying tunnel;

Fig. 3 is a sectional plan view of the burning kiln;

Fig. 4 is an enlarged transverse sectional view of the drying tunnel and showing one form of supporting cylinder;

Fig. 5 is a transverse sectional view of a supporting cylinder of a form differing from that shown in Fig. 4;

Fig. 6 is a transverse sectional view through the burning kiln taken on the line VI—VI of Fig. 3;

Fig. 8 is a plan view showing apparatus for forming the tile and nesting them within the supporting cylinders;

Fig. 9 is a detail sectional view showing the placing of a smaller diameter tile within a larger, which is in turn one of a series of progressively larger diameter tile;

Fig. 10 is a sectional view taken along the line X—X of Fig 9;

Figure 1:
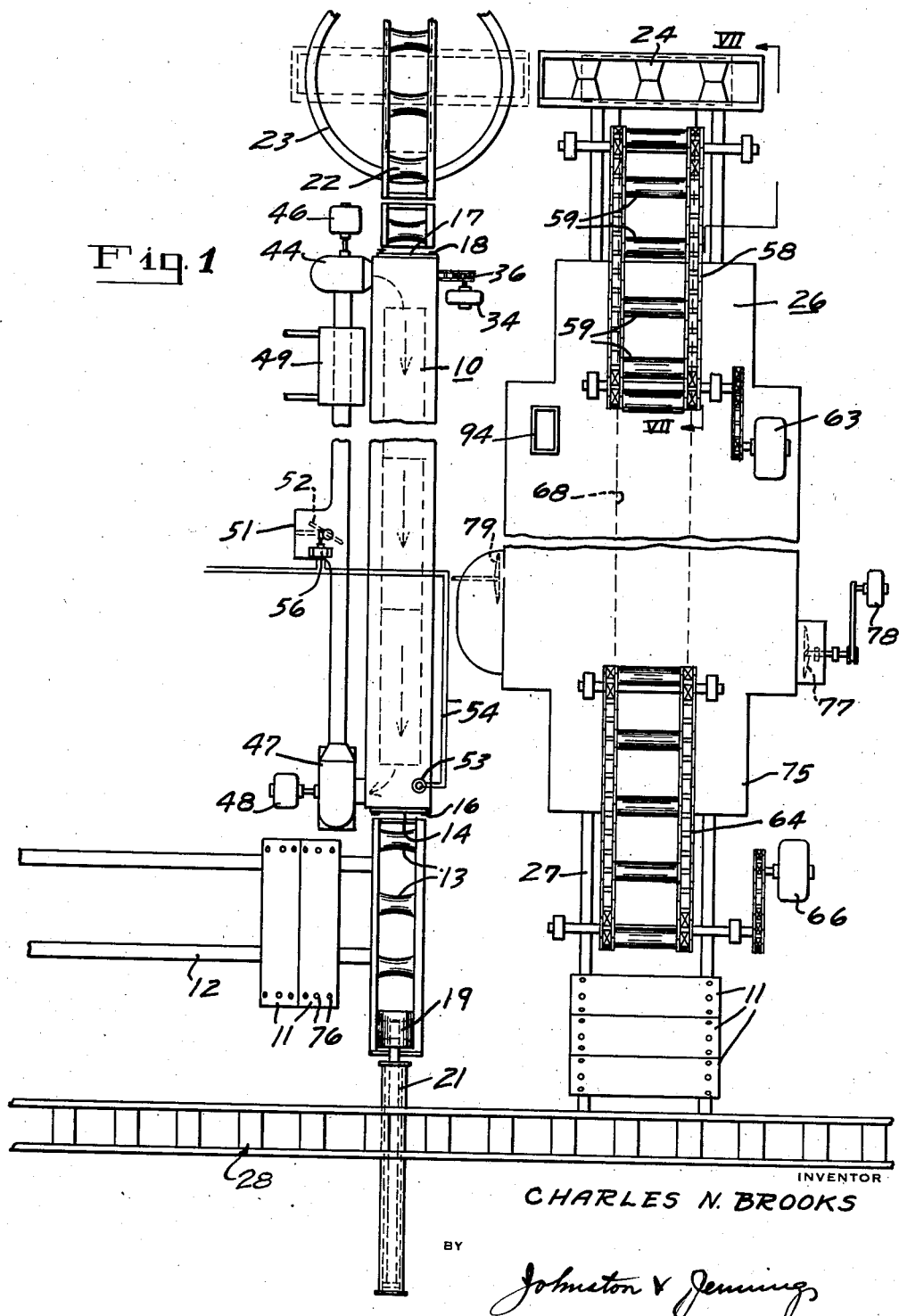
Fig. 1 is a plan view of an installation for drying and burning ceramic cylinders in accordance with my invention.

Referring to the drawings for a better understanding of my invention, I show in Fig. 1 a drier 10 which is in the form of a tunnel of a length sufficient to effect the drying in the manner hereinafter described. Cylindrical tile to be dried are placed, in a manner to be described later, in supporting cylinders 11, which are rolled along tracks 12 on to transverse rollers 13 in front of the drier 10. The drier 10 is provided with an entrance door 14 which may be opened, as by a hinge 16. At the other end is a door 17 hinged at 18. When it is desired to place a supporting cylinder 11 within the drier 10, the doors 14 and 17 are opened and a container is shoved into the drier by means of a plunger 19 operated by a pressure cylinder 21. The plunger pushes the cylinder into the tunnel beyond the entrance door so as to provide for the circulation of drying air around the ends of the cylinder. This shoves a supporting cylinder containing undried tile into one end of the drier and shoves one end of a cylinder having dried tile therein out at the other end of the drier on to transverse rollers 22.

The supporting cylinder may be then moved out of the drier 10, manually or otherwise, on to rollers 22 on a turn table 23, which is turned so that the supporting cylinder can be moved at right angles on to rollers 24 in front of a kiln 26 in which the dried tile are burned. The rollers 24, as shown in the drawings, are made smaller in diameter in the center than at the ends, whereby the supporting cylinders may be positioned square with the kiln before starting them into the kiln. Also it will be noted when the supporting cylinder is removed from the tunnel 10 there is left ahead of the next adjacent cylinder sufficient space for the circulation of air.

The kiln 26 is made in the form of a tunnel of a cross sectional area only slightly greater than the overall dimensions of the supporting cylinders 11, whereby the cylinders may be rolled barrel fashion through the kiln where they are burned in a manner to be described later, and the hot gases employed in burning caused to travel back and forth across the kiln. After burning, the supporting cylinders 11 are discharged on to a track 27 where the burnt tile may be removed. The containers then are placed on rollers 28 where they may be moved to a point where the freshly formed tile may be again nested in them for drying and burning.

Referring to Figs. 2 and 4, the drier 10 is shown as comprising a single elongated tunnel, but it will be apparent that the apparatus shown and described may be duplicated to suit the capacity required. Extending longitudinally of the drier are parallel rollers 29 and 31 supported at intervals and provided with bearings 32 and 33. The rollers 31 are driven by means of a motor 34 through a chain or other suitable drive 36 whereby they are continually rotated.

Disposed in the bottom of the drier 10 are a plurality of transverse rollers 37 which are mounted in channels 38, which channels extend from end to end of the drier between and beneath the parallel longitudinally extending rollers 29 and 31. The channels 38 in turn are supported on plungers 39 of pressure operated cylinders 41 disposed at intervals along the floor of the drying tunnel beneath the channels 38. Whenever it is desired to introduce a cylindrical container into the drier and remove another container therefrom, pressure is admitted to the cylinders 41 through pipes 42, which raises the channels 38 with the rollers 37, thereby raising the cylindrical containers 11 off of the parallel rollers and supporting them on the transverse rollers while being moved endwise through the tunnel. Upon release of pressure from the cylinders, the channels 38, with the supporting cylinders, are lowered and the cylinders again rest on the longitudinally extending rollers.

Near each end of the tunnel 10 is a partition wall 43 which, as may be seen in Fig. 4, has relatively close clearance with respect to the supporting cylinders 11, and defines, at each end, a chamber in cooperation with the adjacent supporting cylinder, for the introduction and withdrawal of air into and from the drying tunnel 10. A fan 44, driven by a motor 46, discharges drying air into the end of the tunnel 10 from which the containers are withdrawn while a blower 47, driven by a motor 48, withdraws the air from the opposite end of the tunnel where the supporting cylinders containing the undried tile are introduced. Due to the fact that the adjacent ends of the supporting cylinders 11 abut and also due to the fact that the partition walls 43 have such close clearance with respect to the cylinders 11, the drying air is caused to flow principally through the supporting cylinders from end to end of the tunnel and this effects a uniform drying of the tile nested within the cylinders.

The drying air may be heated by any suitable means, represented conventionally at 49. Fresh air may be admitted from any suitable source as through an opening 51, and the entrance of fresh air may be controlled automatically by a damper 52 in response to the humidity of the air in the tunnel, as determined by a hygroscope 53 positioned preferably at the end of the tunnel at which the drying air is discharged, and which is connected by means of an electric circuit 54 to a motor 56 adapted to operate the damper 52. Details of this humidity responsive apparatus are not herein described for the reason that it is well known and forms no part of my invention. It is also understood that the temperature of the drying air, as well as its humidity, are matters which are well understood in this art, and require no specific mention other than that the control of the temperature and humidity will be such as to produce the best results.

Figure 7:
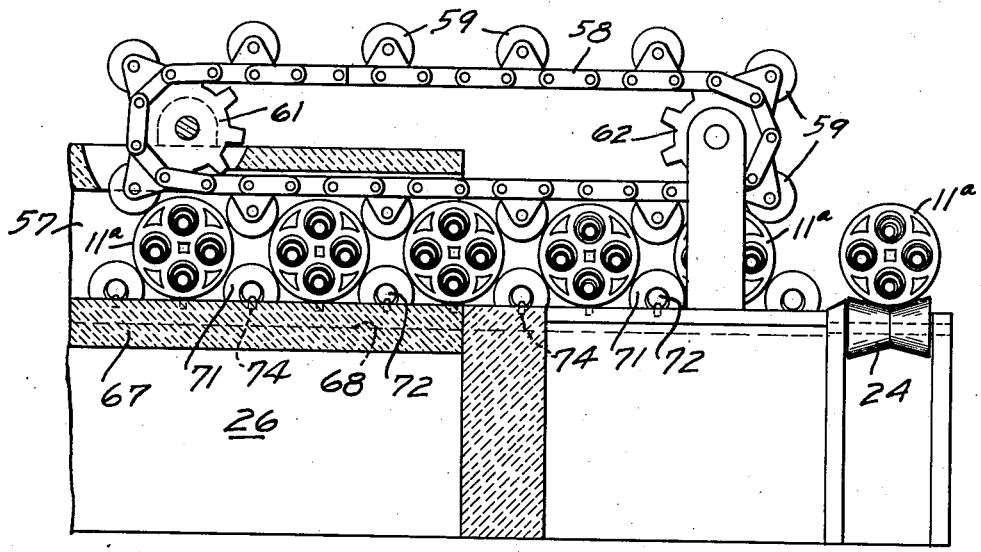
Fig. 7 is a sectional view of the entrance end of the kiln taken along the line VII—VII of Fig. 1.

The kiln 26, shown in detail in Figs. 3, 6 and 7, comprises an elongated tunnel 57 having a cross sectional area only slightly larger than the overall dimensions of the cylindrical supporting cylinders 11. The supporting cylinders 11 are introduced at one end of the tunnel 57 transversely thereof, as shown in Figs. 3, 6 and 7, and are started into the tunnel by a power driven means comprising a sprocket chain 58 having located at intervals thereon rollers 59. The chain 58 is mounted on suitable sprockets 61 and 62, and is driven by means of a motor 63, as shown in Fig. 1 of the drawings. The supporting cylinders 11 are removed from the opposite end of the tunnel 57 by similar sprocket chain and roller assembly 64, driven by a motor 66, which requires no detail description.

By reference to Fig. 6 of the drawings, it will be seen that the floor 67 of the tunnel 57 is provided with a central depression or trough 68. As the cylinders 11 are rolled into the tunnel, there is interposed between each of the cylinders a roller bearing comprising rollers 69 and 71 which extend downwardly into the trough 68 and are mounted on a shaft 72 which rests on the sides of the trough 68. The rollers 69 and 71 are spaced apart by a collar 73 formed integrally with the shaft 72. The roller assembly, it will be understood, is made of refractory material capable of withstanding the high temperature of the kiln, and serves to maintain the supporting cylinders 11 in spaced relation so that the adjacent surfaces thereof do not rub together, as may be seen in Fig. 7. They thus serve to reduce the friction of the cylinders in their travel through the tunnel 57.

The supporting cylinders 11 are maintained in alignment in their travel through the tunnel 57 by means such as refractory teeth 74, which are disposed at regular intervals in the floor 67 and which engage in cooperating recesses 76 provided near the ends of the supporting cylinders 11 and thus act as cooperating rack and gear means to maintain the cylinders in alignment. The teeth 74 are removable and may be readily replaced as required.

Air for cooling the burnt tile and for combustion is introduced into the end 75 of the tunnel 57 at which the burnt tile is discharged, by means of a blower 77 driven by a motor 78. The cool air thus forced into the tunnel passes over and through the hot supporting cylinders 11 and the contained tile to cool it. A second booster blower 79, driven by a motor 81, aids in forcing the air back across the tunnel and through and over the supporting cylinders 11.

The air thus preheated passes downwardly through ports 82 and 83 in the floor 67 of the tunnel into passages 84 and 86 beneath the tunnel (see Fig. 6), and after passing through the passages 84 and 86 passes upwardly through passages 87 and 88 in the floor of the tunnel to furnish preheated air for combustion of gas, oil or other suitable fuel supplied through burners 89 and 91. The burners 89 and 91 raise the temperature of the gases in the tunnel to that necessary to "burn" the tile in the supporting cylinders 11. The opposed walls of the tunnel 57 are curved as at 92 and 93 to aid the reversal of the gases flowing through the tunnel and cause them to flow back and forth across the tunnel through and over the supporting cylinders 11. The relatively close fit of the supporting cylinders in the tunnel prevents any great volume of air to flow over the cylinders longitudinally of the tunnel. The gases, after passing through and over the supporting cylinders in the tunnel 57 are discharged through a stack 94 near the end of the tunnel 57 where the supporting cylinders enter. In its travel through and over the supporting cylinders, the gases are gradually cooled and serve to preheat the incoming supporting cylinders. It will be understood by those skilled in the art that the showing of the burners and of the blowers is intended to be merely conventional and that sufficient burners will be provided to insure the proper temperature for burning and a sufficient means will also be provided to force the air through the tunnel in the manner contemplated.

Figure 11:
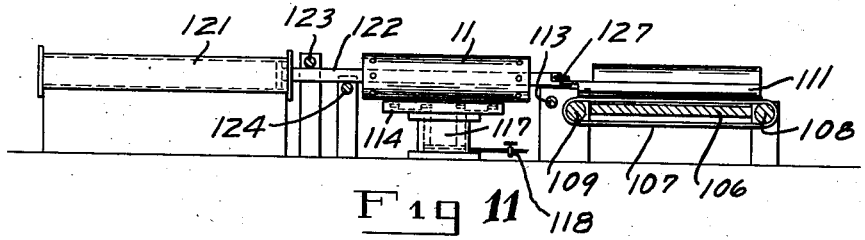
Fig. 11 is a sectional view of the nesting apparatus taken on line XI—XI of Fig. 8.
Figure 12:
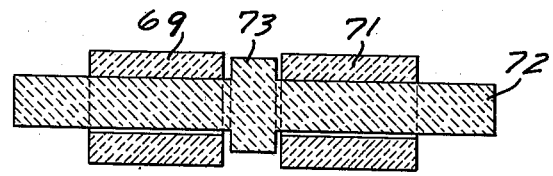
Fig. 12 is a detail view of a spacing and friction reducing element employed in my improved kiln.

The supporting cylinders 11, as will be appreciated from the foregoing description, are necessarily made of a refractory material capable of withstanding the temperature of the kiln. They may be made of cast iron for the drying operation, but are preferably formed of refractory ceramic material to withstand better the burning operation. The cylinders 11 may be of the form shown in Fig. 4 having a single opening therethrough capable of accommodating a series of progressively decreasing diameter tile for drying and burning. Inasmuch, however, as the demand for the smaller size of tile is greater than for the larger, it may be necessary to use a supporting cylinder 11a, such as shown in Fig. 5, which includes a plurality of cylindrical openings 96, each capable of having nested therein a plurality of smaller diameter tile 97 which are to be dried and burned. It will be appreciated that the system will be operated in a manner to provide the desired output and that cylinders 11 of the form shown in Fig. 4, or 11a as shown in Fig. 5, will be employed to produce the required output of different sizes.

While the plastic cylinders may be formed in any manner known to the art, I have found that unless special means be provided to nest or telescope the smaller diameter cylinders within the larger, that considerable loss may be entailed due to breakage or distortion of the shape while in an undried plastic condition. In Figs. 8 to 11 are shown apparatus for carrying out this feature of my invention. At 101 and 102 I show extruders which are adapted to produce plastic tile in various sizes which are discharged upon cutting tables 103 and 104. Some of these, especially the smaller sizes, may be extruded at the same time, one or more within another. For example, a six inch tile might be extruded within an eight inch from a single extruder, or a two and one-fourth inch tile might be extruded within a four inch tile. After being cut, the tile are rolled along a table 106 on to a belt 107 mounted on pulleys 108 and 109. Toward the center of the belt 107 is interposed a cradle 111 which is crescent shape in cross section, as seen in Fig. 10, and has an interior surface conforming to the exterior surface of the tile 112. Positioned in front of the pulley 109 is a roller 113 over which the cradle 111 with the tile 112 therein is advanced into the interior of supporting cylinder 11 mounted opposite the roller 113. The supporting cylinder 11 is mounted on parallel rollers 115 on a table 114 supported on the plunger 116 of a hydraulic jack 117 controlled by valve 118. The supporting cylinder 11 is thus brought to rest opposite the roller 113 in such a position that the tile 112 may be introduced thereinto with its underside near the bottom of the supporting cylinder 11 or tile within which it is to be nested. As shown in Fig. 9, the tile 112 may be one of a series of tile 119 of progressively decreasing diameters, it being understood that each of the tile thus shown will have been previously introduced in the manner described for tile 112 or extruded as heretofore mentioned.

At the opposite end of the cylinder 11 is a power cylinder 121 having a plunger 122 which passes first under a roller 123 and then over a roller 124, which rollers are interposed between the power cylinder 121 and the supporting cylinder 11. The forward end of the plunger 122 is provided with a supporting lip 126 above which is a latch member 127. The supporting lip 126, when the plunger 122 is extended through the supporting cylinder 11, engages with a cooperating lip 128 on the cradle 111 so as to support that end of the cradle as it is being drawn into the supporting cylinder. The latch 127 engages over the end of the cradle 111 so that as the plunger 122 is withdrawn from the cylinder 11, it draws the cradle 111 with the tile 112 thereinto. When the tile has been properly placed within the cylinder, the plunger 122 is disengaged, and the supporting cylinder 11 with the cradle 111, is rotated on the rollers 115 to permit the tile 112 to roll off the cradle, whereupon the cradle may be withdrawn from the cylinder.

When a supporting cylinder has been loaded with tile in a plastic condition as just described, it is immediately placed in the drying tunnel where it is maintained in rotation, as described, until dry and ready to burn.

It will be apparent from the foregoing that I have provided an improved method and apparatus for the production of cylindrical ceramic tile by means of which such tile may be produced more economically, less drying and burning space employed and with less loss due to misshapen tile.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are imposed by the prior art or as are specifically set forth in the appended claims.

What I claim is:

1. The method of drying cylindrical ceramic tile preliminary to burning which comprises moving a plurality of supporting cylinders endwise in series through a drying chamber, telescoping one or more lesser diameter cylindrical tile in each of said cylinders, rotating the supporting cylinders to maintain the tile in cylindrical form while drying, and passing drying air longitudinally through the chamber and the cylinders.

2. The method of drying cylindrical ceramic tile preliminary to burning which comprises moving a plurality of supporting cylinders endwise in series through a drying chamber, nesting lesser diameter cylindrical tile in each of said cylinders, rotating the supporting cylinders to maintain the tile in cylindrical form while drying, and passing drying air longitudinally through the chamber and the cylinders counter to the direction of longitudinal movement of the cylinders.

3. The method of drying and burning cylindrical ceramic tile which comprises telescoping smaller diameter tile within larger diameter tile drying the tile while rotating, and burning the tile.

4. In the manufacture of cylindrical ceramic tile, nesting undried tile within supporting cylinders, moving a plurality of said cylinders horizontally end to end through a drying tunnel, rotating the cylinders in unison, and passing drying air longitudinally through the supporting cylinders in series.

5. In the manufacture of cylindrical ceramic tile, nesting undried tile within supporting cylinders, moving a plurality of said cylinders horizontally end to end through a drying tunnel, rotating the cylinders in unison, passing drying air longitudinally through the supporting cylinders, transferring the cylinders to a kiln, rolling the cylinders with the dried tile therein through the kiln for burning, and passing hot gases longitudinally through the cylinders as they move from position to position in the kiln to burn the tile.

6. In the manufacture of cylindrical hollow ceramic ware, nesting a plurality of pieces of said ware one within the other, rotating said nested pieces while in a horizontal position, passing heated air longitudinally through the rotating pieces to dry them, transferring said pieces as a group and while still assembled to a kiln, continuously rolling the pieces through said kiln in a horizontal position, passing hot gases longitudinally through said nested pieces to burn them, said gases having a gradually increasing temperature from the inlet end of said kiln to a burning zone and a gradually decreasing temperature from said burning zone to the exit end of said kiln.

7. In the manufacture of cylindrical ceramic tile, nesting the tile in supporting cylinders, rolling the cylinders through a burning kiln, maintaining the cylinders in spaced relation and horizontal alignment while rolling them through the kiln, and passing hot burning gases longitudinally through the cylinders.

8. In the manufacture of cylindrical ceramic tile, nesting the tile in supporting cylinders, rolling the cylinders through a burning kiln containing hot gases, maintaining the cylinders in spaced relation and horizontal alignment while rolling them through the kiln, and reversing the direction of gas flow as the cylinders are advanced from position to position in the kiln.

9. In apparatus for the continuous production of cylindrical ceramic tile, a plurality of supporting cylinders in which the tile are nested for drying and burning, a drying tunnel through which the supporting cylinders are moved in end to end relation, parallel power driven rollers upon which the cylinders are supported and rotated while in the tunnel, transverse rollers disposed beneath the supporting cylinders between the parallel rollers in the tunnel, means to raise and lower the transverse rollers to raise the cylinders off the parallel rollers, and power means to push the cylinders through the tunnel.

10. In apparatus for the continuous production of cylindrical ceramic tile, a plurality of supporting cylinders in which the tile are nested for drying and burning, a drying tunnel through which the supporting cylinders are moved in end to end relation, parallel power driven rollers upon which the cylinders are supported and rotated while in the tunnel, transverse rollers disposed beneath the supporting cylinders between the parallel rollers in the tunnel, means to raise and lower the transverse rollers to raise the cylinders off the parallel rollers, power means to push the cylinders through the tunnel, and means to pass drying air longitudinally through the cylinders in the tunnel.

11. In apparatus for the continuous production of cylindrical ceramic tile, a plurality of supporting cylinders in which the tile are nested for drying and burning, a drying tunnel through which the supporting cylinders are moved in end to end relation, parallel power driven rollers upon which the cylinders are supported and rotated while in the tunnel, transverse rollers disposed beneath the supporting cylinders between the parallel rollers in the tunnel, means to raise and lower the transverse rollers to raise the cylinders off the parallel rollers, power means to push the cylinders through the tunnel, means to pass drying air longitudinally through the cylinders in the tunnel, a kiln adapted to receive the supporting cylinders from the drier and through which the cylinders are adapted to be rolled, means to transfer the cylinders to the kiln, the cylinders fitting within the kiln with relatively close clearance, means to maintain the cylinders in spaced relation within the kiln, means to maintain the cylinders in alignment, and power operated means to push the cylinders into and remove them from the kiln.

CHARLES N. BROOKS.